Jan. 8, 1929.
W. J. BEATTIE
1,698,469
COLLAR FOLDING MACHINE
Filed April 26, 1927
12 Sheets-Sheet 5
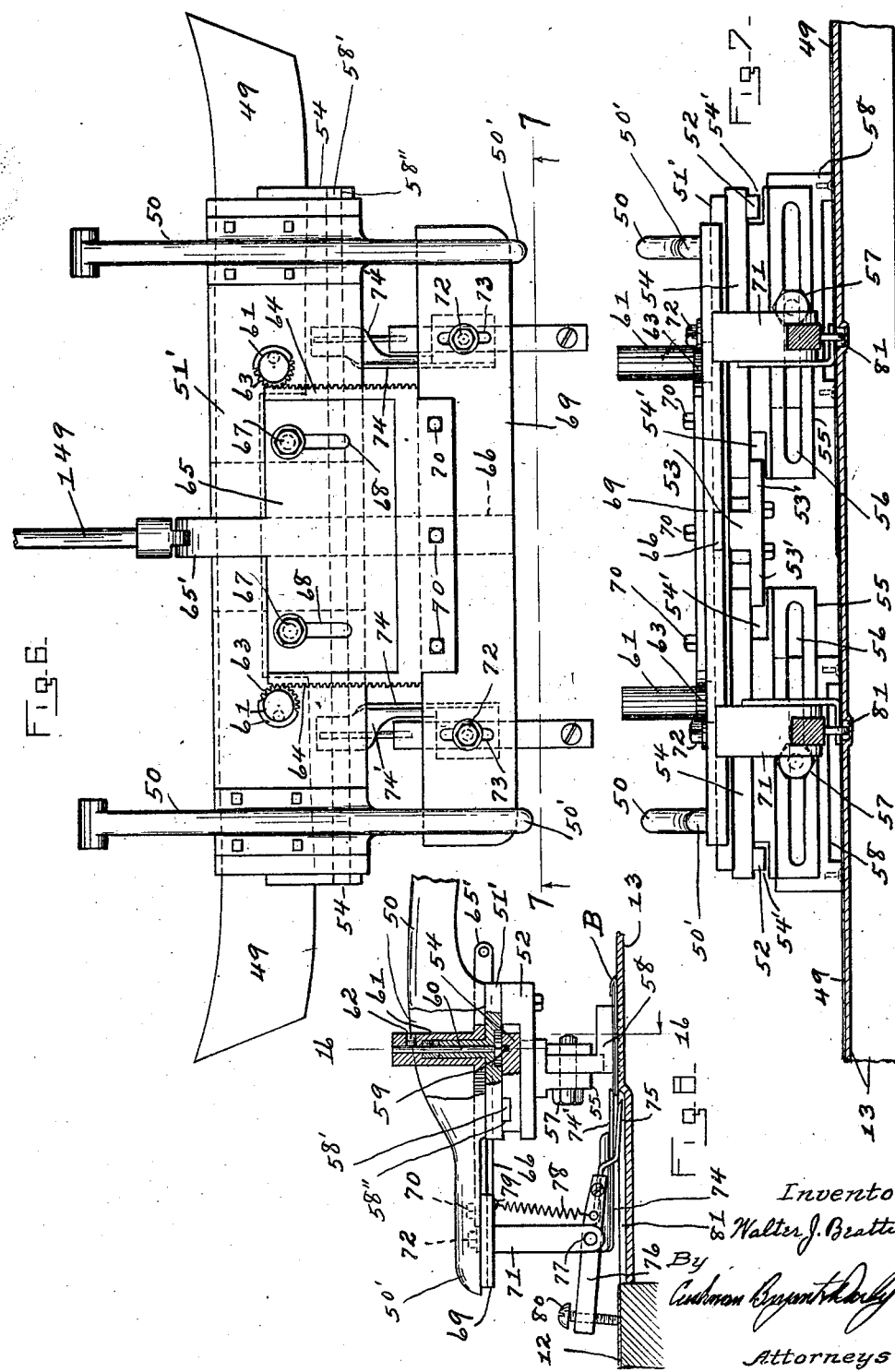
Inventor
Walter J. Beattie
By
Cushman Bryant Darby
Attorneys

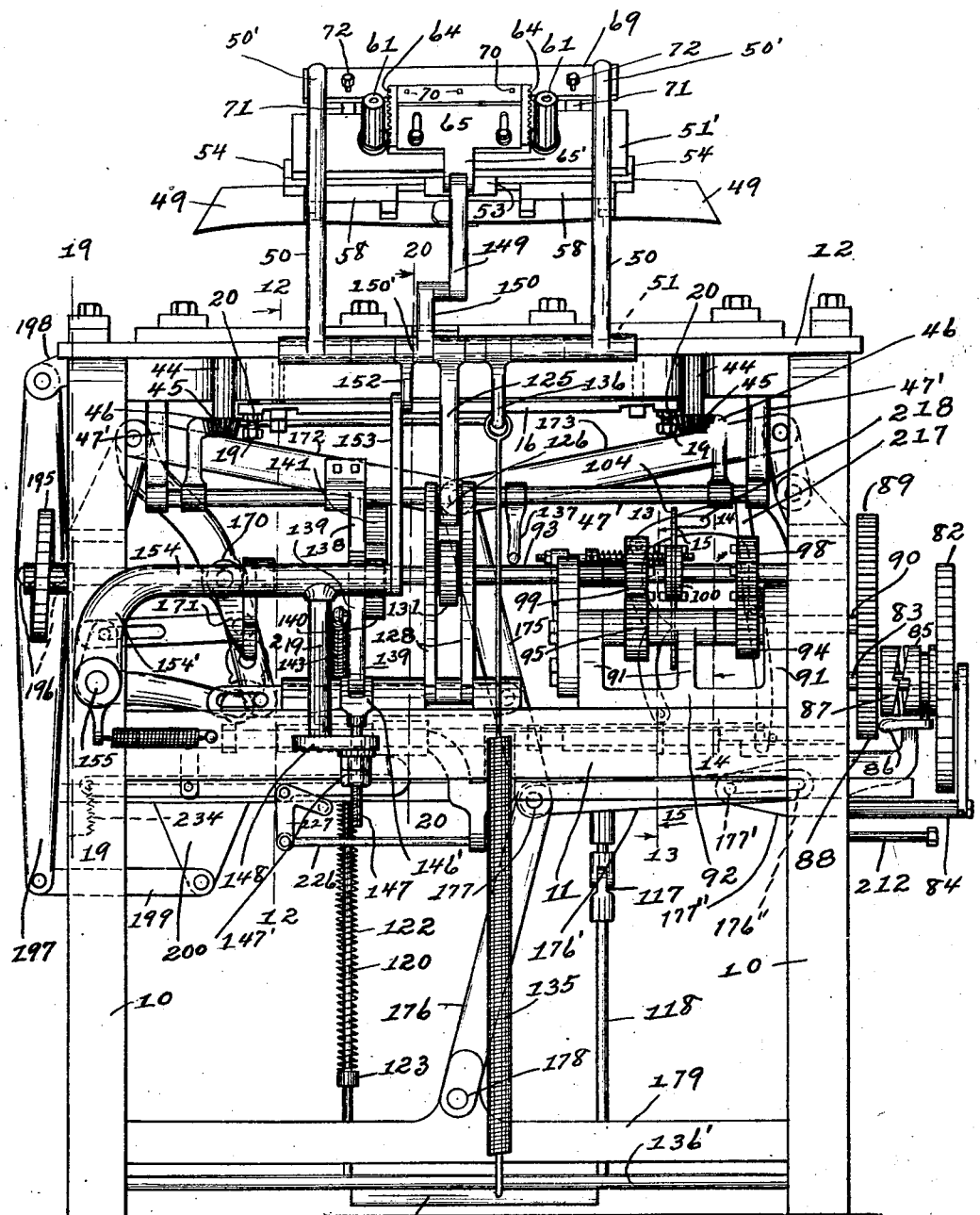

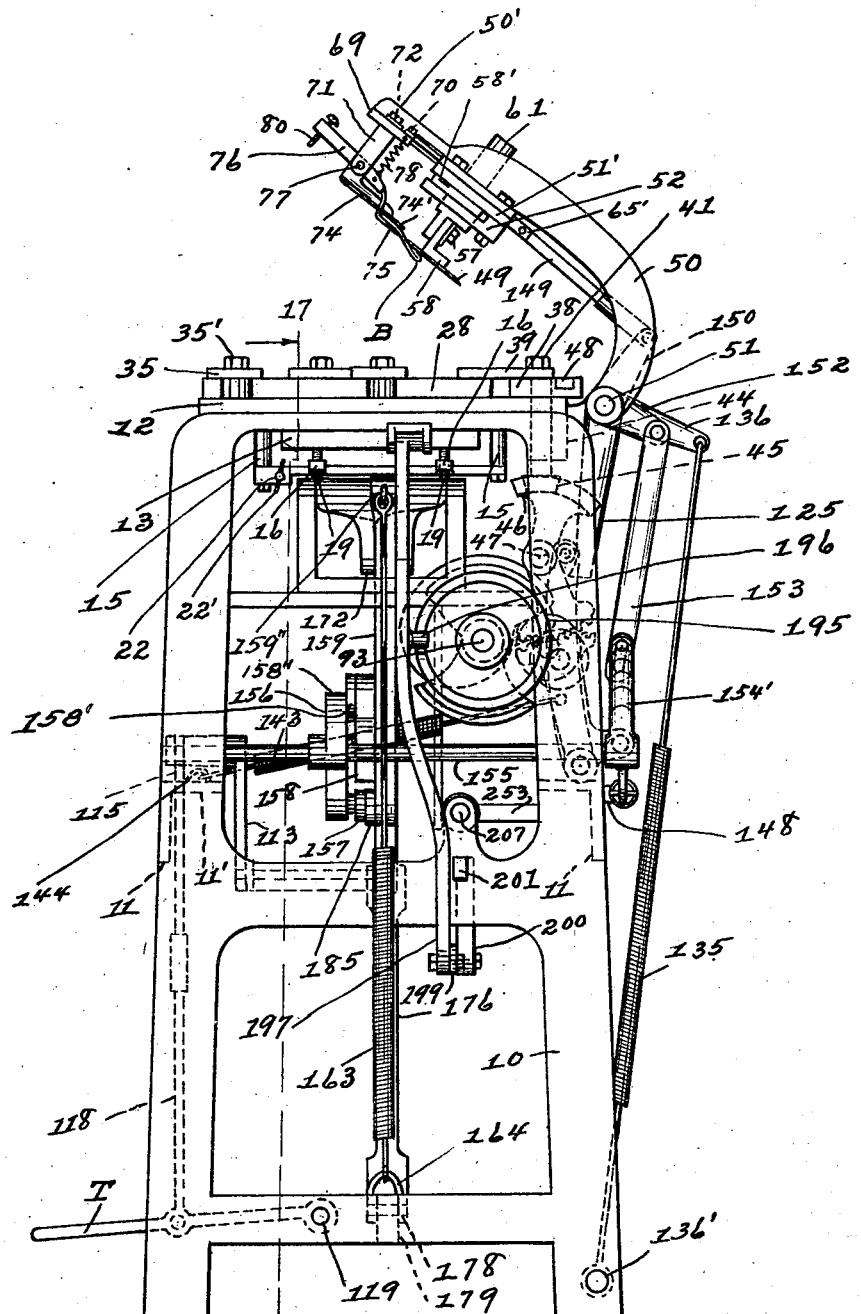

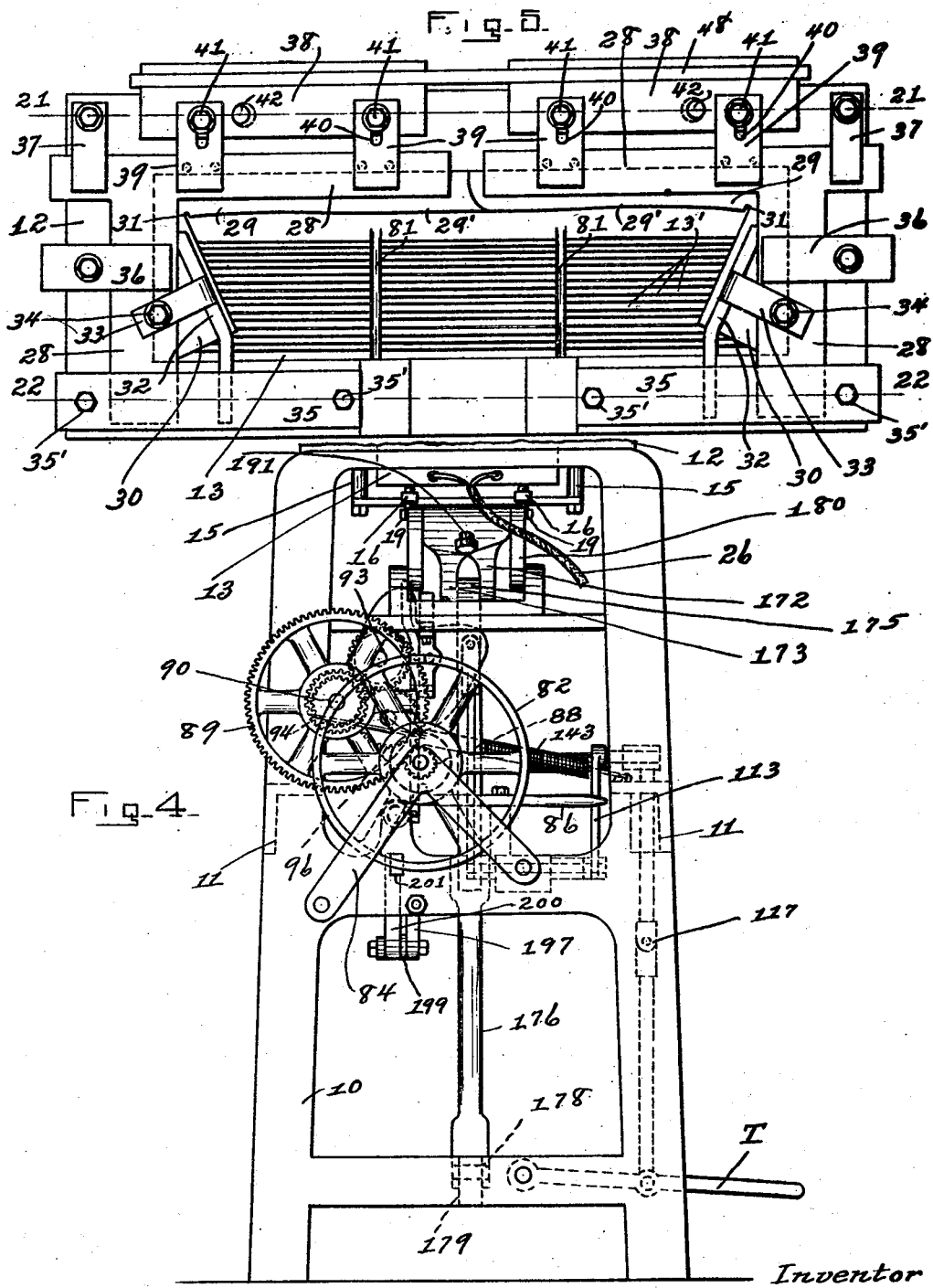

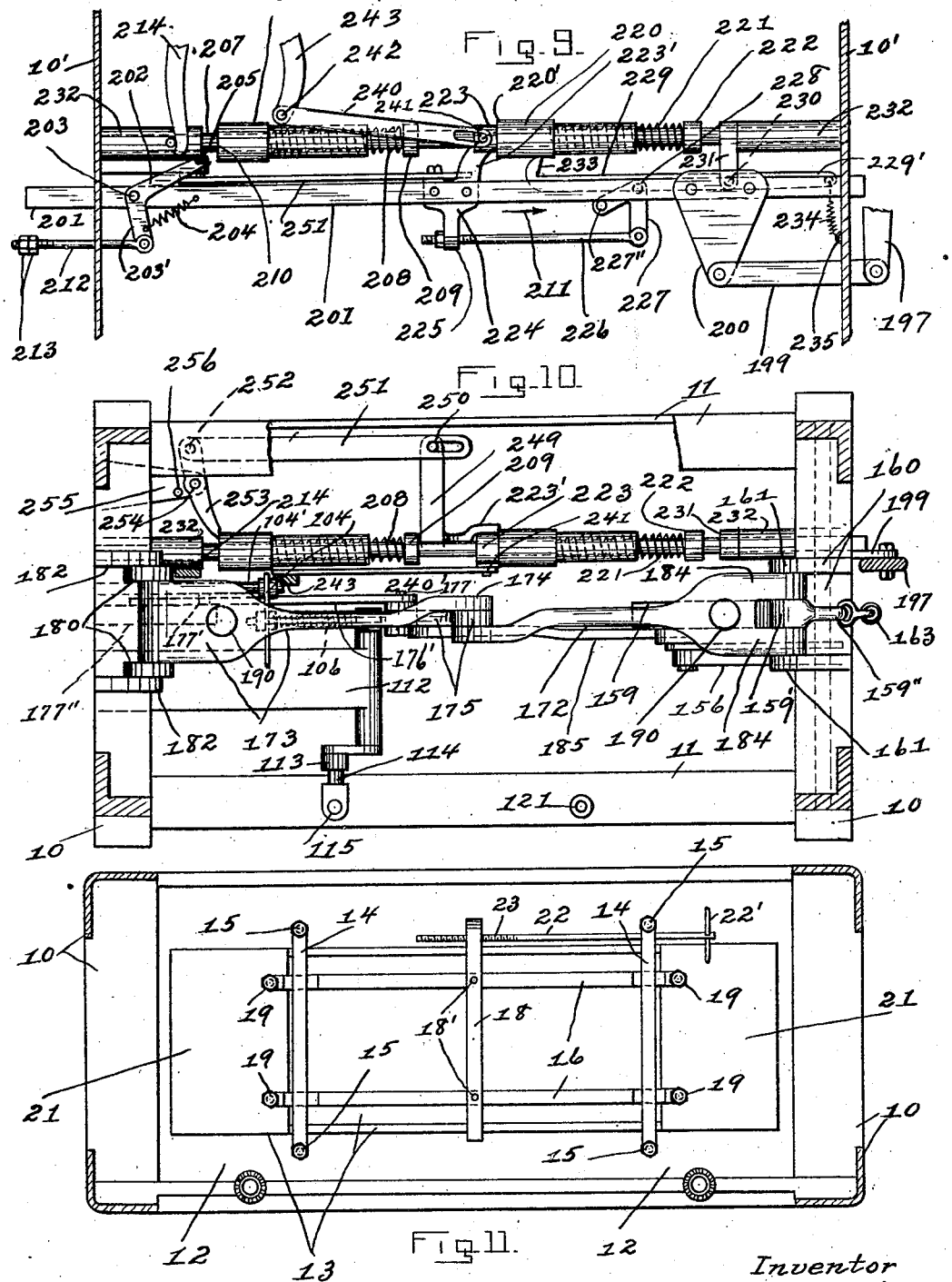

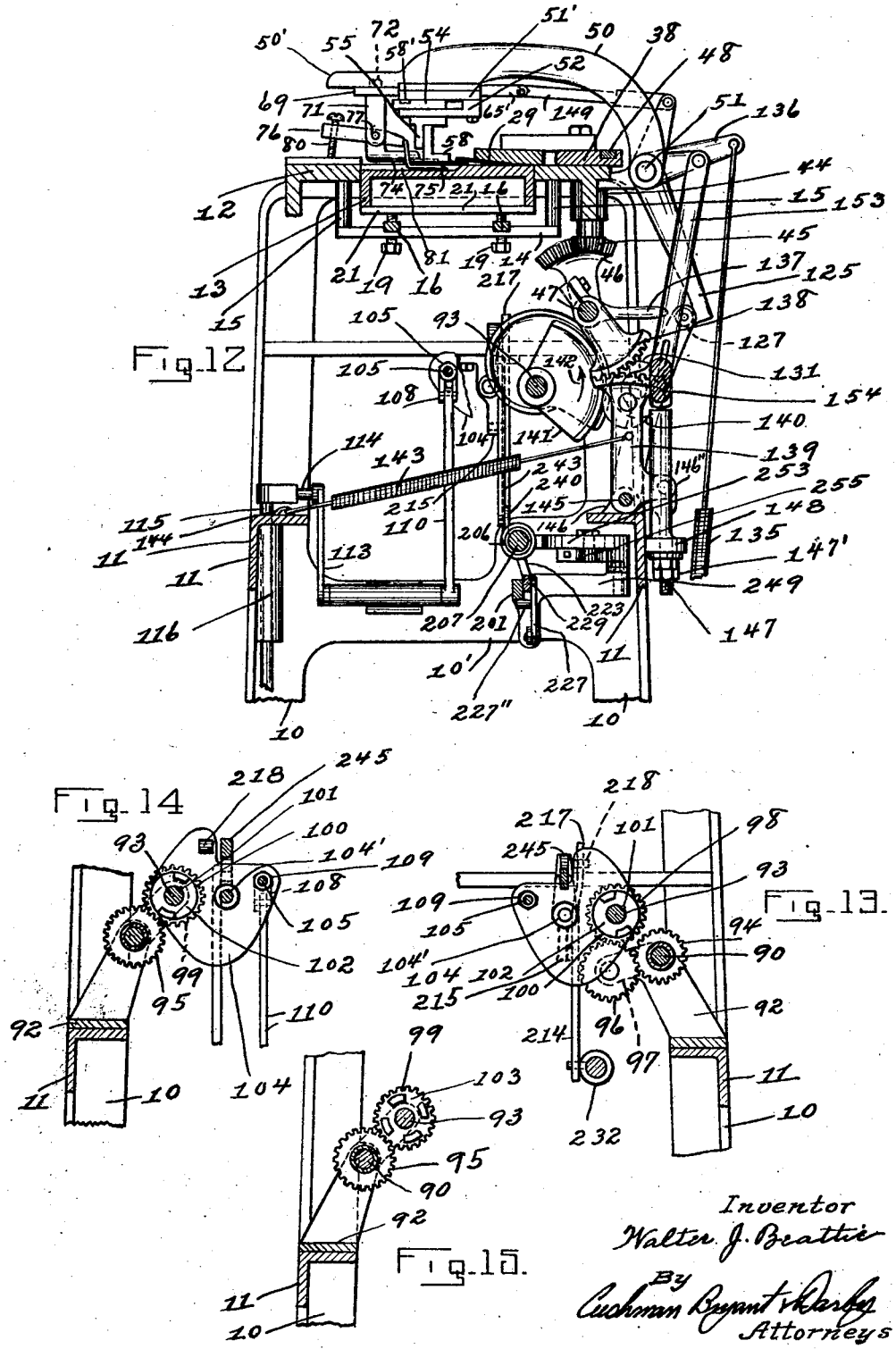

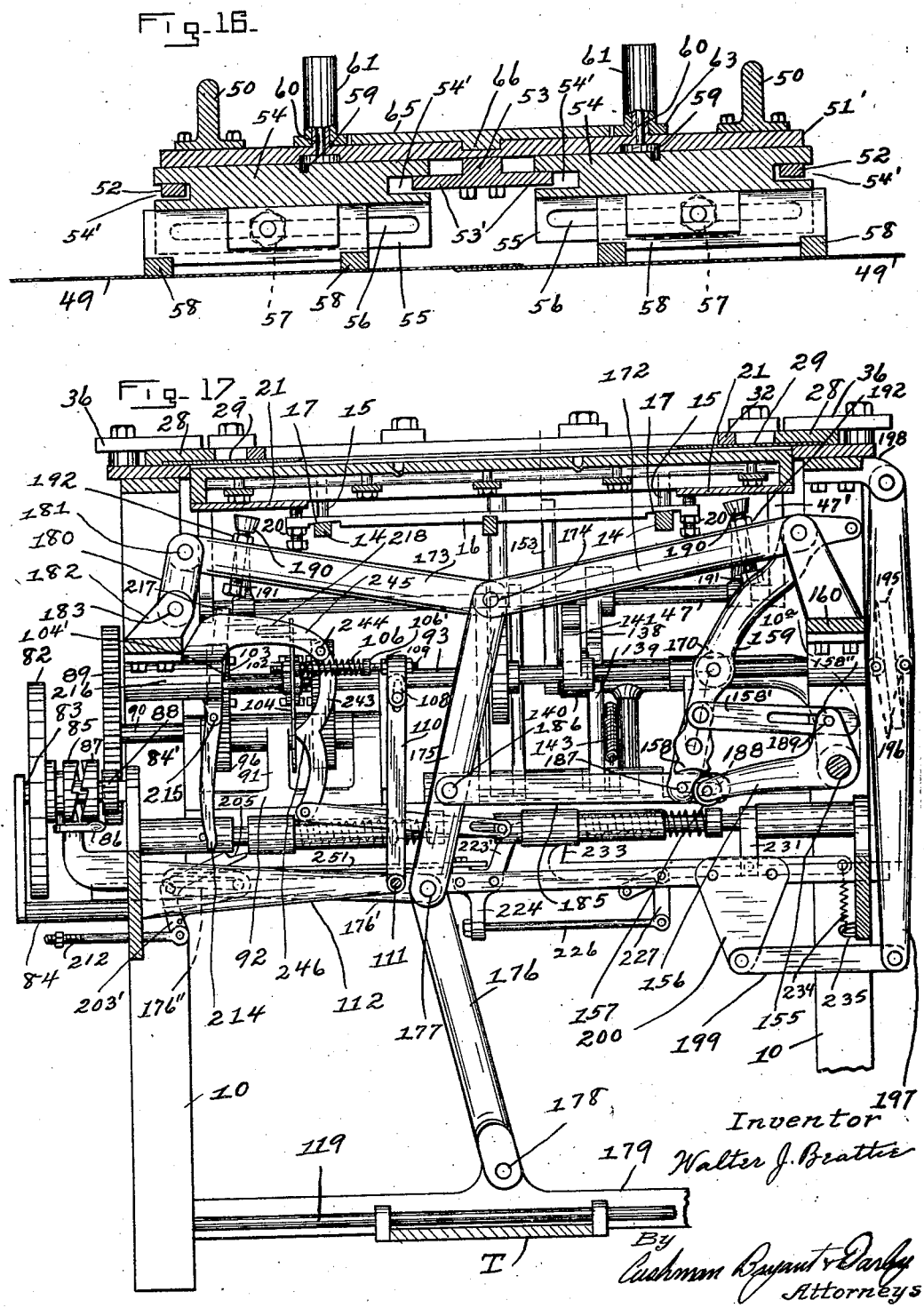

Jan. 8, 1929.  1,698,469
W. J. BEATTIE
COLLAR FOLDING MACHINE
Filed April 26, 1927   12 Sheets-Sheet 9

Inventor
Walter J. Beattie
By
Cushman Bryant & Darby
Attorneys

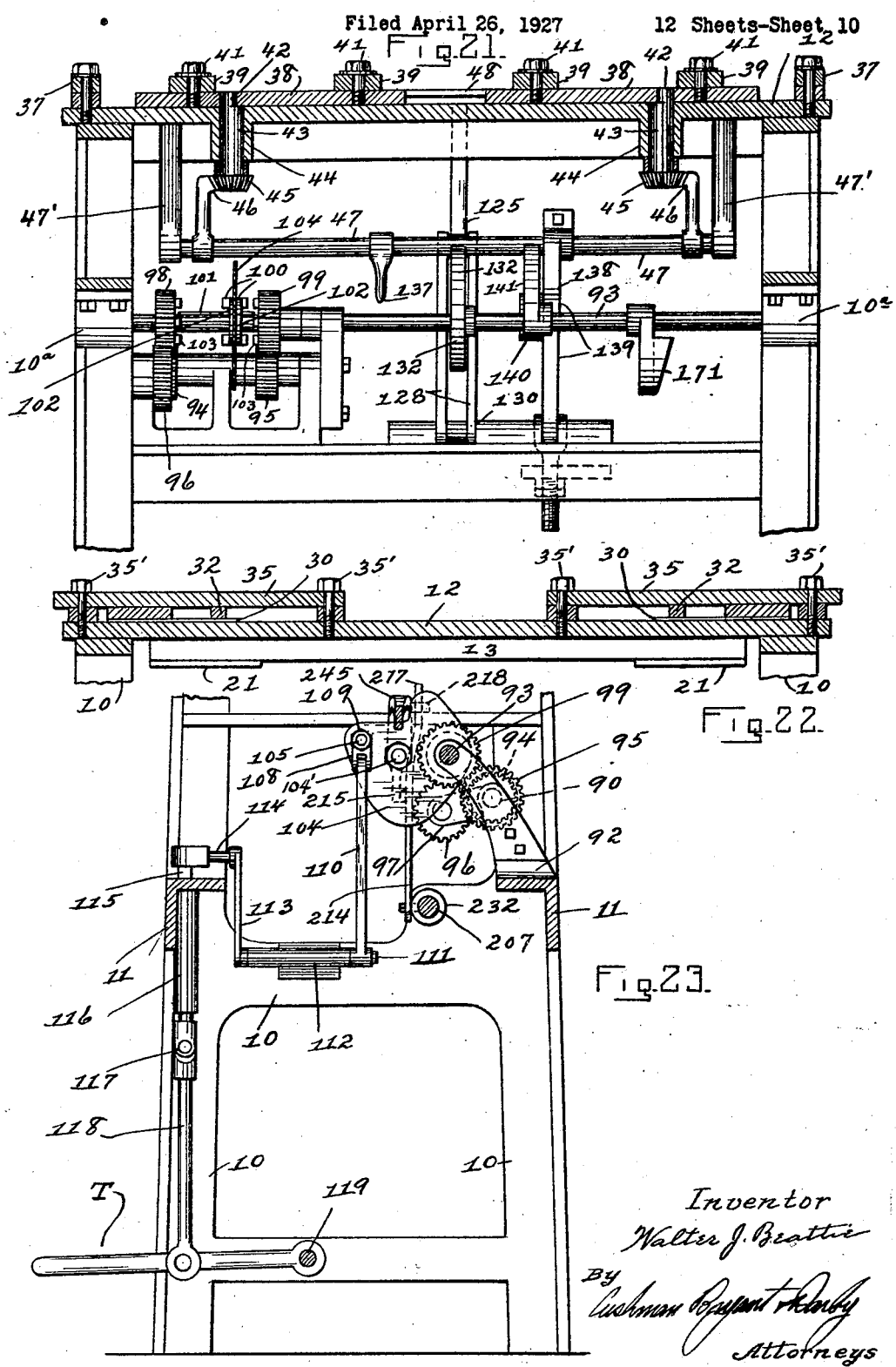

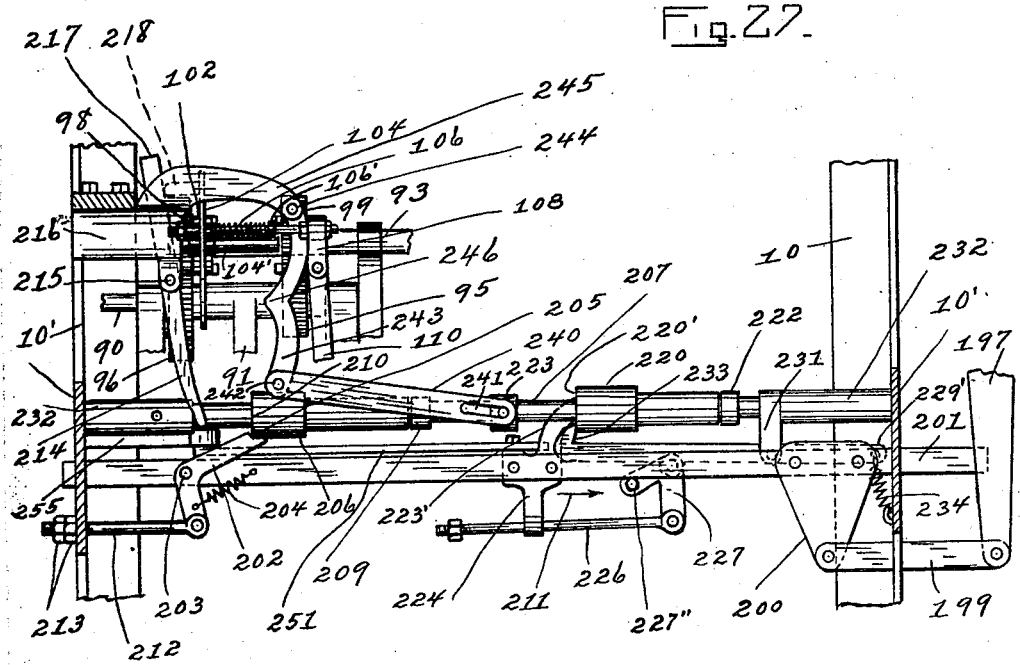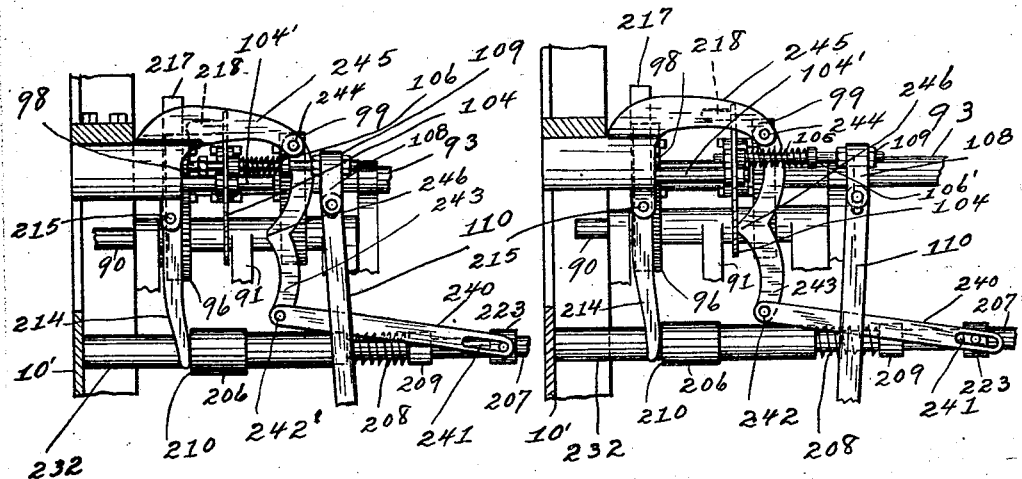

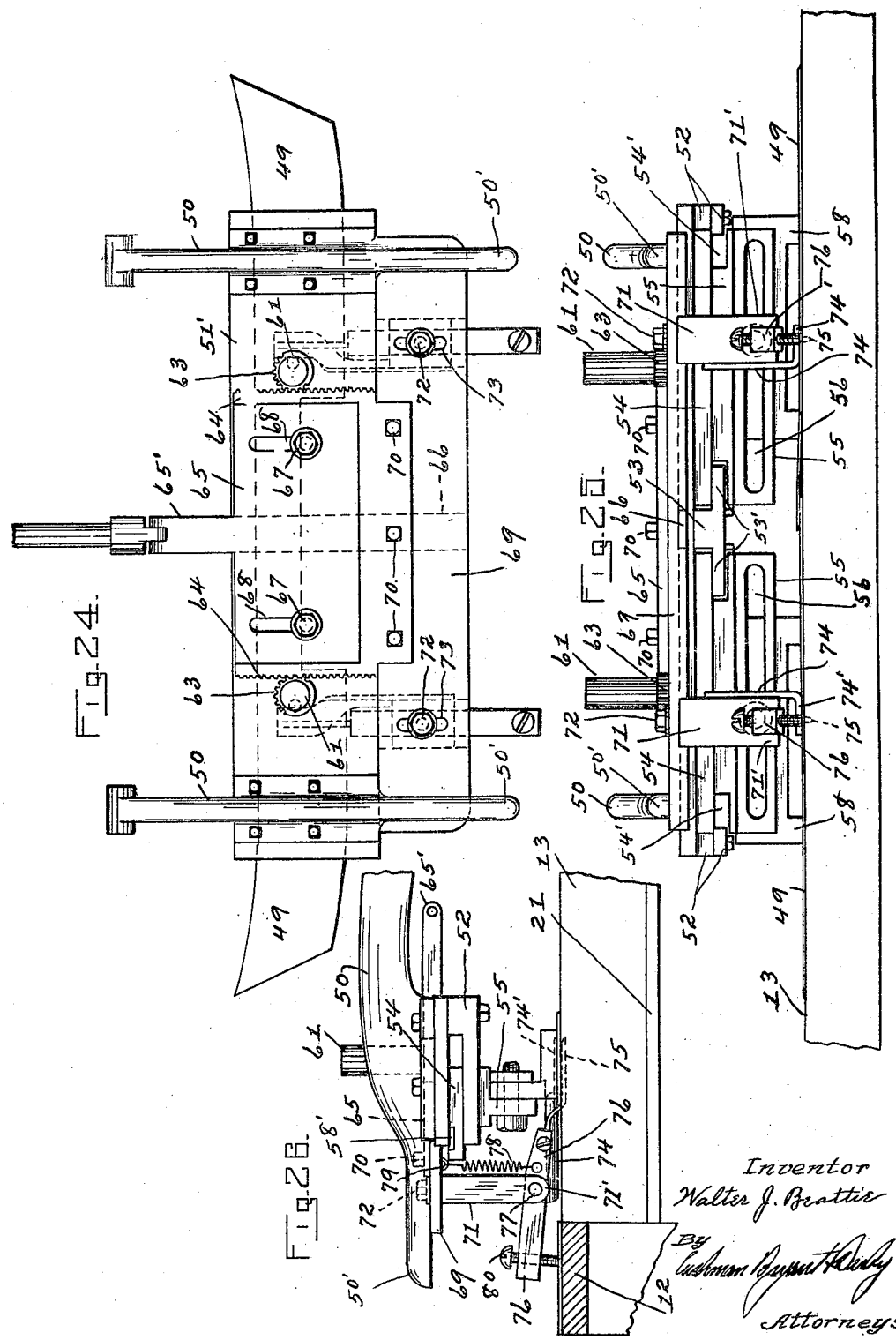

Patented Jan. 8, 1929.

1,698,469

UNITED STATES PATENT OFFICE.

WALTER J. BEATTIE, OF COHOES, NEW YORK, ASSIGNOR TO THE BEATTIE MANUFACTURING CO., OF COHOES, NEW YORK, A CORPORATION OF NEW YORK.

COLLAR-FOLDING MACHINE.

Application filed April 26, 1927. Serial No. 186,705.

The present invention relates to folding machines intended for folding the edges of collar blanks, and for pressing the same so that the fold will be retained when the blank is removed from the machine.

An object of the invention is to provide a machine which will automatically perform the usual operations of folding and pressing, and the other operations ordinarily incidental thereto, such as the contraction of the former dies, the removal of the folding dies, and the subsequent raising of the former dies, while at the same time permitting the operator to vary at will, or selectively, the length of one of the operations, preferably, the pressing operation.

Another object of the inventioin is to improve in construction, the various mechanisms for performing the individual operations whereby to render them more efficient in the effect produced, and to increase the operating capacity of the machine.

These objects have to do, for instance, with the mounting for the presser bed, including its adjustability to various ranges of movement, with the means for interrupting the operation of the machine in its sequence of steps, and for reversing the drive with the means for expanding and contracting the former dies, and with various other features of the machine which will become clearer as the description proceeds in connection with the preferred embodiment illustrated in the accompanying drawings, wherein:

Figure 2 is a rear elevational view.

Figure 3 is an end elevational view looking from the right of the machine as viewed in Figure 1.

Figure 4 is a fragmentary and elevational view looking from the left as viewed in Figure 1.

Figure 5 is a top plan view of the bed showing the folding dies.

Figure 6 is a top plan view of the movable head carrying the former dies and the blank lifting fingers.

Figure 7 is a front view of the movable die carrying head on the line 7—7 of Figure 6, showing the same in operative position on the bed, part of which is shown in section.

Figure 8 is a fragmentary side elevational view of the head with parts shown in section.

Figure 9 is a detail view taken on a vertical plane showing the automatic mechanism for actuating the clutch.

Figre 10 is a horizontal sectional view taken immediately beneath the bed and its support, and illustrating the clutch shifting mechanism and the means for raising the bed.

Figure 11 is a bottom plan of the bed showing its support.

Figure 12 is a fragmentary vertical sectional view on the line 12—12 of Figure 2, looking in the direction of the arrows.

Figure 13 is a fragmentary sectional view on the line 13—13 of Figure 2, looking in the direction of the arrows.

Figure 14 is a vertical sectional view on the line 14—14 of Figure 2, looking toward the left.

Figure 15 is a sectional view on the line 13—13 of Figure 2, looking in the direction of the arrows 15.

Figure 16 is a transverse sectional view through the movable head on substantially the line 16—16 of Figure 8.

Figure 17 is a vertical sectional view on the line 17—17 of Figure 3, looking in the direction of the arrows.

Figure 1:
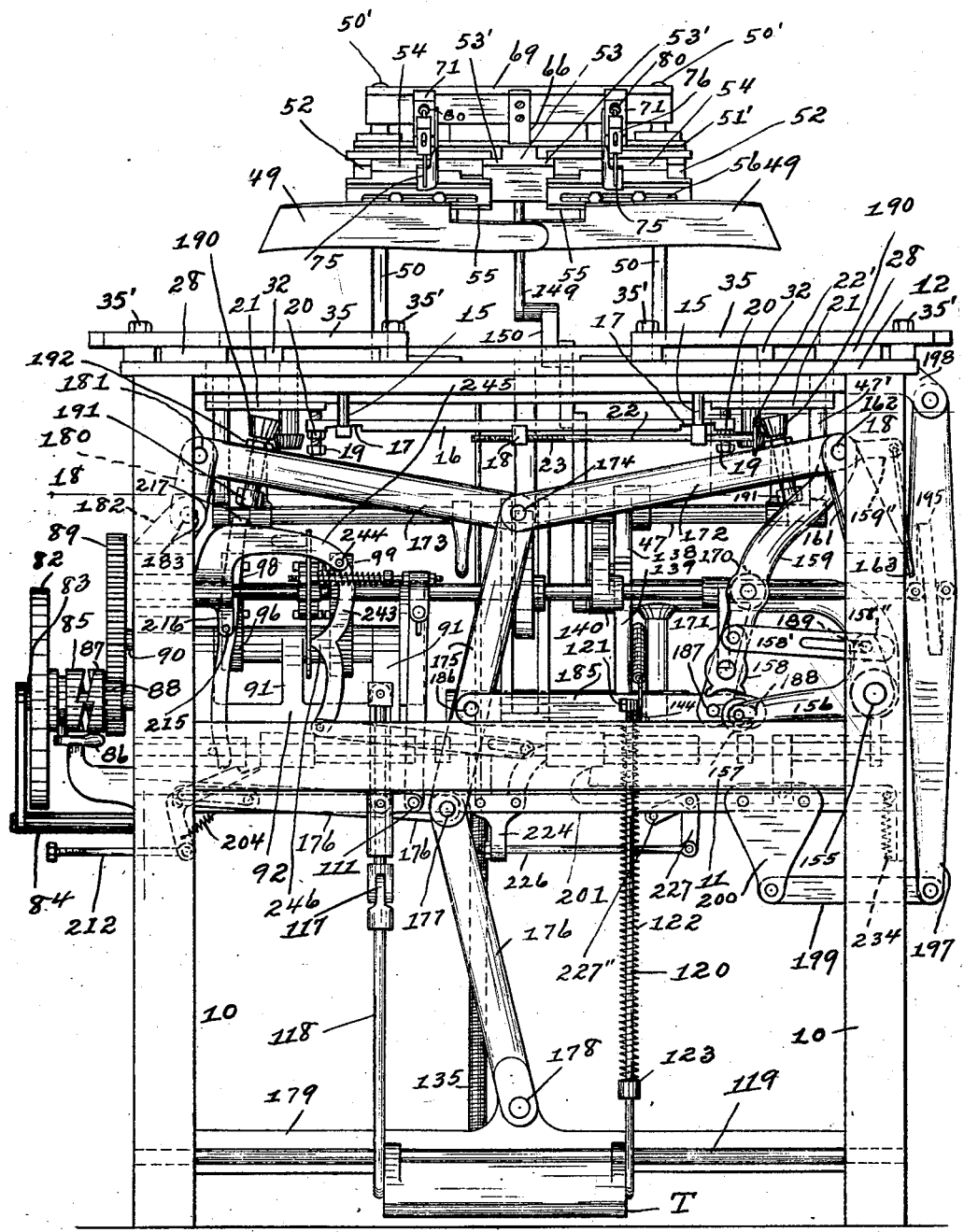
Figure 1 is a front elevational view.
Figure 18:
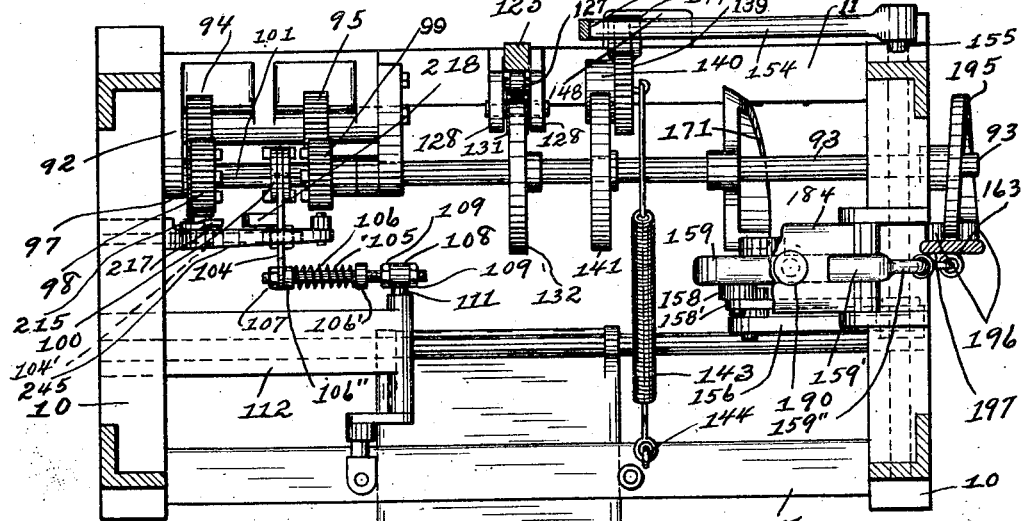

Figure 18 is a horizontal sectional view on the line 18—18 of Figure 1.

Figure 19:
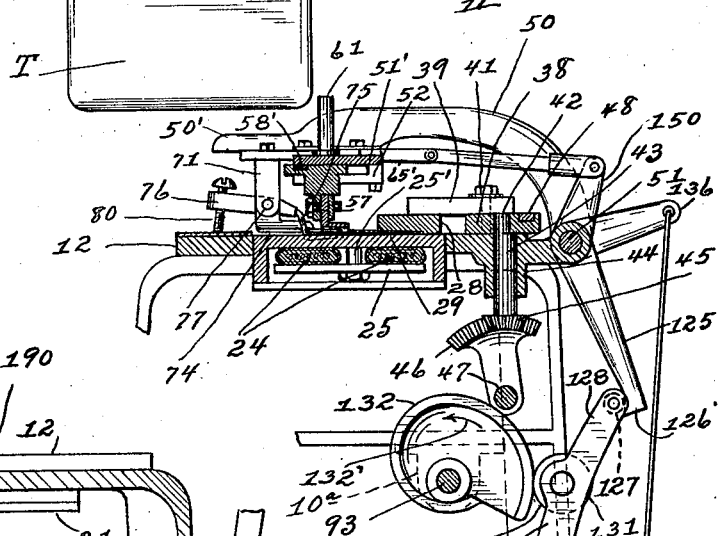

Figure 19 is a fragmentary vertical section on the line 19—19 of Figure 2 looking toward the right.

Figure 20:
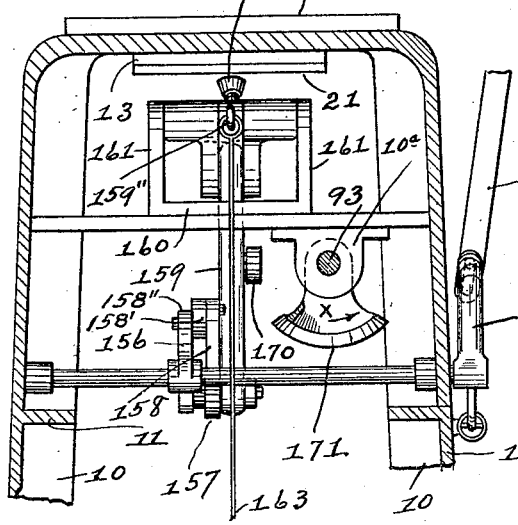

Figure 20 is a vertical sectional view on the line 20—20 of Figure 2, looking in the direction of the arrows.

Figure 21 is a vertical sectional view on the line 21—21 of Figure 5, looking toward the front of the machine.

Figure 22 is a vertical sectional view through the top plate surrounding the bed on the line 22—22 of Figure 5.

Figure 23 is a vertical sectional view on a plane extending from front to rear of the machine, showing the connections between the treadle and the clutch.

Figure 24 is a top plan view of the movable head similar to Figure 6, but showing the lift fingers for the blank advanced beneath the former dies.

Figure 25 is a front elevational view of the head showing the parts in the position illustrated in Figure 24.

Figure 26 is a side elevational view of the head with the parts in the position illustrated in Figure 24.

Figure 27 is a partial vertical sectional view showing the position of the automatic clutch shifting mechanism illustrated in Fig. 9, just before the clutch is disengaged from gear, 98.

Figure 28 is a detail view showing the position of the treadle connections with the clutch, immediately following disengagement with the clutch of gear, 98, and during the material pressing operation, and Figure 29 is a view similar to Fig. 28, showing the position of the treadle-clutch connections during the engagement of the clutch with reverse gear, 99.

Referring to the drawings for a more detailed description, the machine comprises end supporting frames, 10, connected by front and rear cross braces 11 intermediate their upper and lower ends, and by a top 12, having a centrally disposed substantially rectangular opening (Figure 12) in which is arranged a vertically movable bed 13, having a ribbed top surface 13', supported freely for vertical movement upon a cradle consisting of forwardly and rearwardly extending strips 14 (Figures 11 and 17) carried by pins 15 depending from top, 12.

Above the strips 14, and across the same, extends a slidable frame formed of strips 16 having cut-away portions on their under surfaces to provide wedge bearing surfaces 17 (Figure 1) resting upon the strips 14; the strips 16 are connected by a cross brace 18 secured by pins 18' thereto (Figure 11) and at their ends they carry bed supporting screws 19, vertically adjustable through openings in the strips 16, and adapted to be locked in any vertical adjusted position by lock nuts 20.

The screws engage abutment plates 21 on the undersurface of the bed 13, and, as will be understood, by relative adjustment of the same, the bed may be maintained exactly level. Provision is made for adjusting the normal position of the bed, in the present instance, by means of an adjusting rod, 22, having a threaded end 23, extending through the block 18 connecting the wedge strip 16, and provided with a fixed bearing in one of the supporting strips 14, so that when the rod 22 is turned by means of its handle 22', the strips 16 will be moved to cause their wedge surfaces 17 to traverse the tops of the strips 14, and thus the entire bed will be bodily raised or lowered, depending upon the direction in which the strips 16 are moved.

The bed is formed so that it may receive immediately beneath its top surface a suitable heating means (Figure 20) such as the electrical resistance elements 24 arranged on supporting plates 25 carried by pins 25', the heating unit being connected with any suitable source of current by means of a lead wire 26 (Figure 4).

Immediately above the bed are arranged the folding dies 29, which are of conventional form, and are carried by L-shaped slides 28. The dies have longitudinal edge folding portions 29', and transverse shorter edge forming portions 30, the two portions being spaced at their meeting edges by a short slot 31 provided to enable forming the desired corner fold for the collar blank. The die elements are connected to the slidable carriers 28 by means of rods 32 (Figure 5) fixedly secured to the dies, and having short arms 33 extending upwardly and over the corners to receive securing bolts 34. The rods 32 extend toward the front of the machine, and fit beneath strips 35 (Figure 1) which are spaced above the top and are secured thereto by screws 35'. The strips also have extending therebeneath the ends of the die carriers 28, the latter being slidable beneath end holding lugs 36 at the ends of the machine, and rear holding lugs 37; the lugs 36 and 37 and front strips 35 serve to maintain the dies and carriers upon the machine bed and to resist upward movement thereof during the pressing operation in which the upward movement of the bed presses the folded blank against the folding dies.

The die carriers 28 are connected with slide blocks 38 by means of flat links 39 having elongated slots 40, through which pass securing bolts 41, extending into the slide blocks 38, thereby permitting slight adjustment of the folding die carriers forwardly and rearwardly of the machine. The slide blocks are formed to receive the eccentric ends 42 of short vertical shafts 43 (Figure 21), extending through bearings 44 in the top 12, and carrying at their lower ends bevel pinions 45 adapted to mesh with beveled segmental gears 46 (Figure 20) carried by a rock shaft 47 supported at its ends in bracket arms 47' (Figure 2) extending downwardly from the top 12 and adapted to be rocked through suitable mechanism, which will be later described, to impart the desired turning movement to the slide blocks actuating shafts 43. The slide blocks are provided with grooved top surfaces (Figure 12) through which extends a bar 48, serving to maintain the slide blocks in fixed relation as they are moved by the eccentrics upon the vertical shafts 43 to impart the desired movement to the folding dies.

As will be understood, the folding dies cooperate with former dies 49, which are carried by a head movable toward and from the bed by means of a pair of arms 50, mounted at the rear of the machine upon a shaft 51 (Figures 1, 2 and 3). The carrying head for the former dies is shown most clearly in Figures 6, 7, 8 and 16, and different positions of its parts are shown in Figures 24, 25 and 26.

The arms 50 are connected by a supporting plate 51' having on its under surface and adjacent its opposite ends, supports 52 adapted to cooperate with an intermediate depending support 53 having oppositely extending portions 53', each cooperating with one of the end supports 52 to secure between them a slide block 54. Each slide block 54 has end slots 54' receiving said supports and has depending therefrom a rib 55, which is formed with an elongated slot 56 to receive bolts 57 adapted to clamp thereto the vertically disposed web of a head 58 carrying a former die 49.

The slide blocks (Figure 16) are actuated by means of crank pins 59 extending into openings in the top surfaces of the slide blocks and having stems 60 projecting upwardly through short hollow shafts 61, to which they are secured by means of set screws 62 (Figure 8); the shafts 61 are formed at their lower ends with mutilated gears 63 meshing with racks 64 upon a slidable plate 65, adapted to be moved forwardly and rearwardly to move the dies (Fig. 6) by operating mechanism which will be later described. It will be understood, however, that as the slide plate is moved forwardly and rearwardly, the slide blocks and the former dies carried thereby, will be actuated in the desired manner by reason of the crank pin connection 59 between the shaft 61 and the slide blocks and the range of movement of the dies may be varied as desired, by adjusting the same on the slide blocks. The slide blocks are held in fixed relation to one another by a bar, 58' (Figs. 6 and 8) felled in grooves 58'' on the top surfaces of the blocks.

The rack plate 65 which actuates the dies is formed on its under surface with a guide rib 66, which works in a suitable groove in the top surface of the plate 51', and it is held against upward movement by means of bolts 67 extending into the plate 51 through elongated slots 68 formed in the rack plate.

The head carries suitable means for lifting the folded material from the bed as the head is raised, and this means, in the present instance, comprises a carrier plate 69 secured by means of bolts 70 to the forward edge of the rack plate 65, and having its ends beneath extensions 50' of arms 50, said extensions serving to hold the carrier plate against upward movement. The carrier plate 69 has on its under surface a pair of spaced depending brackets 71, which are adjustably secured to the plate by means of bolts 72 extending through elongated slots 73, which permit the desired adjustment of the brackets, and the latter carry at their lower ends, substantially rigid rearwardly extending fingers 74 provided with broadened end portions 74'. Beneath the end portions 74' are disposed substantially wire like gripping fingers 75, each of which is secured to lever 76, pivoted within the forked lower end 71' of a bracket 71 (Figure 25), the forked end having a transverse pivot stud 77, extending therethrough to support the pivoted arm 76. The end of the lever 76, carrying the clamping finger, 75, is yieldingly urged upwardly so that the clamping finger 75 will be pressed toward the terminal portion 74' of finger 74 until the head rises, by means varied as desired, by adjusting the same on the slide blocks.

The rack plate 65 which actuates the dies is formed on its under surface with a guide rib 66, which works in a suitable groove in the top surface of the plate 51, and it is held against upward movement by means of bolts 67 extending into the plate 51 through elongated slots 68 formed in the rack plate.

The head carries suitable means for lifting the folded material from the bed as the head is raised, and this means, in the present instance, comprises a carrier plate 69 secured by means of bolts 70 to the forward edge of the rack plate 65. The carrier plate 69 has on its under surface a pair of spaced depending brackets 71, which are adjustably secured to the plate by means of bolts 72 extending through elongated slots 73, which permit the desired adjustment of the brackets, and the latter carry at their lower ends, substantially rigid rearwardly extending fingers 74 provided with broadened end portions 74'. Beneath the end portions 74' are disposed substantially wire like gripping fingers 75, each of which is secured to lever 76, pivoted within the forked lower end 71' of a bracket 71 (Figure 25), the forked end having a transverse pivot stud 77, extending therethrough to support the pivoted arm 76. The end of the lever 76, carrying the clamping finger 75, is yieldingly urged upwardly so that the clamping finger 75 will be pressed toward the terminal portion 74' of finger 74 when the head rises, by means of a contractile spring 78, connected to the arm and to an eye 79 (Figure 8) upon the carrier plate 69.

The portion of the arm at the opposite side of the pivot 77 is disposed above the top plate 12 of the machine, and carries an adjustable abutment screw 80, adapted to normally engage the top surface of the bed plate 12 when the head is lowered, and, as illustrated in Figure 8, when the screw 80 abuts the top plate of the machine, the finger 75 is normally spaced below the finger 74' and disposed within one of a pair of grooves 81 formed in the vertically movable bed (Figure 5).

It will further be observed that the finger 74' is spaced above the plane of the bed so that as the finger carrier plate moves rearwardly with the rack plate 65, to which it is attached, and which actuates the former dies to contract the latter upon such rearward movement, the fingers 74 will be carried above the blank B and former dies 49 (Figure 8) and the fingers 75 will be carried beneath the blank and former dies. As will be explained later, during the same operation, the dies 49 are contracted to carry the same outside the fold previously formed in the blank by the folding dies. When the pressure of the abutment screw upon the top plate 12 of the machine has been released as the movable head raises, each finger 75 will be drawn toward the under surface of a former die 49 by spring 78, and thus will clamp the folded material blank during the first part of the upward travel of the head against the under face of the former dies (Figs. 20 and 26) and later against the rigid finger 74', as the latter, with finger 75, are moved away from the former dies by the carrier plate 69 (Fig. 3), thereby lifting the blank from the bed with the head. It will thus be observed that the lifter or picker mechanism engages and lifts the blank independently of the fold, since it is arranged adjacent the unfolded edge. Moreover, the fingers 74 pass entirely beneath the blank and not merely beneath the folded over edge, and hence do not disturb the fold.

The mechanism thus far described includes virtually all of the parts of the machine which operate directly upon the material, namely, (1) the folding dies 29; (2) the former dies 49 carried by the movable head; (3) the vertically movable bed 13 upon which the material is folded and which may be moved upwardly to press the fold; and (4) the fingers 74, 75 which lift the folded blank with the head as the latter rises after the folding and pressing operation.

The operating mechanism for these various parts will be clearer if reference is first had to the operating sequence of the parts thus far described.

As will be understood, the former die carrying head is normally in raised position (Figure 3), and after the blank is arranged upon the bed 13, with its edges to be folded substantially paralleling or adjacent the edges of the former folding dies 29, the head is lowered so that the former dies are upon the material. The folding dies are then actuated to fold the end edges and one longitudinal edge of the blank. The next operation is a movement of the former dies, which is accomplished through rearward movement of the rack plate 65 upon the movable head, to withdraw the dies from the fold. This same movement carries the fingers 74, 75 respectively above and below the blank in addition to withdrawing the former dies 49 out of the fold. The next operation is an upward movement of the bed, which presses the folds of the blank against the stationary former dies, which are so held against upward movement under the pressure of the bed by the holding lugs 35, 36, 37, secured to the top 12 of the machine. Preferably, the machine is constructed, as will be later described, so that this pressing operation may be continued as long as the operator may desire, and upon its termination, the folding dies are withdrawn from over the folded blank and the movable head then rises carrying the folded blank therewith, the blank being gripped by the fingers 74, 75.

*The operating mechanism.*—Power is received by the machine through a pulley 82 loosely mounted upon a short shaft 83 at one side of the machine (Figure 1), and supported by a substantially U-shaped bracket 84, and a frame bearing 84' (Figure 17). The pulley has rotatable therewith, a clutch face 85, which may be operated by means of a shifting lever 86 to be thrown into and out of engagement with a complementary clutch face 87 rotatably mounted on the shaft 83 and having fixed for rotation therewith a spur gear 88, constantly in mesh with a larger gear 89 upon a counter-shaft 90, which extends through bearing arms 91 in a bracket 92 supported upon the rear cross bars 11 (Figure 2). The counter shaft 90 is arranged below and slightly to the rear of a cam shaft 93, the cam shaft extending the entire width of the machine, and having bearings 10ª (Figs 19–21) in the end frames. The cam shaft is adapted to be driven in opposite directions, selectively, from the counter shaft 90, and the driving connections are from gears 94, 95 rotatable with the counter-shaft between the arms 91 of the bracket 92. The gear 94 (Figures 2 and 13) meshes with an idler gear, 96, supported upon an extension 27 of a bracket arm 91, and the idler is constantly in mesh with a gear 98, freely rotatable upon the same shaft. The gear 95 meshes directly with a gear 99 mounted upon the cam shaft and freely rotatable thereon. It will be understood that the gears 94 and 95 are adapted to impart rotation to their respective gears 98, 99, upon the cam shaft, and the direction of rotation of the latter will depend upon which one of those two gears is coupled with the shaft through a clutch collar 100 (Figure 21). The clutch collar is keyed to the shaft 93 by means of a key 101 extending between the two gears, 98, 99, the collar having opposite clutch faces 102 whereby it may be engaged, selectively, with complementary clutch faces 103 upon the gears 98, 99.

In order that it may be shifted in opposite directions, the collar rotatably fits within an opening in a substantially heart shaped plate 104 (Figure 23) which slides on a fixed rod 104' (Fig. 13) projecting from the frame and has a yielding connection with a treadle, T. The connection of the clutch shifting plate with the treadle is by means of a pin 105 slidably extending through an opening in the plate 104, but yieldingly restrained against movement in one direction through the plate by means of a spring 106 which abuts a collar 106' on the pin and tends to throw the pin to the right as viewed in Figures 17 and 18, against a stop nut 107; the opposite end of the spring abuts a collar 106", freely slidable on the pin against plate 104 under the pressure of the spring. The pin is connected at one end by means of a downwardly extending forked lug 108, (Figure 23) held in fixed position on the pin by means of clamping nuts 109 (Figure 17 and 18) with a crank arm 110, which is connected with a rock shaft 111 mounted in the end of a horizontally extending bracket arm 112, extending inwardly from the adjacent end frame 10. The opposite end of the shaft 111 is connected by means of an arm 113 with a short pin 114 upon the upper end of a pitman 115, which operates through a bearing 116 in the front angle brace 11, and is connected by means of a joint 117 with a rod 118, actuated from the treadle T, which is pivotally mounted upon a cross bar 119. The treadle has connected therewith a vertically reciprocable rod 120 (Figure 1), extending upwardly through a bearing in the front cross brace 11, the rod having a stop nut 121 on its upper end limiting downward movement of the treadle, and being surrounded by a compression spring 122 which abuts the inwardly extending flange 11' of the cross brace 11 and the collar 123 upon the rod. This spring serves to resist yieldingly upward movement of the treadle under the spring action of the remainder of the machine, and thus to maintain the treadle in its substantially horizontal position.

It will be understood that depression of the treadle will move the clutch collar 100 from its neutral position illustrated in Figure 1 to cause its clutch face to engage the clutch face 103 upon cam shaft gear 98, the latter revolving freely upon the cam shaft by power transmitted by pulley 32 through gears 88, 90, 94 and 96 (Figure 13).

Rotation thus imparted to the cam shaft 93 by engagement of the clutch faces upon the clutch collar 100 and gear 98, effects the following operations in succession:

1. The lowering of the movable head carrying the former dies 49 to bring the latter upon the material which has previously been placed upon the bed.

2. The actuation of the rock shaft 47 and segmental racks 46 thereon to move the folding dies, thereby folding the edges of the material.

3. The contraction of the former dies to carry the same from within the fold, and the simultaneous movement of the lift fingers 74, 75 from the position shown in Figure 8 in front of the material to the operative position in which they are arranged, respectively, above and below the material, as illustrated in Figures 20 and 26.

4. The upward movement of the bed 13 to press the folds between the bed and the folding dies.

As soon as the upward movement of the bed has been completed, the clutch collar 100 is automatically thrown to a neutral position out of engagement with cam shaft gear 98 by mechanism which will be later described, but can not move into engagement with the reversing gear 99 as long as the treadle is depressed because of the pressure (Fig. 28) of spring 105 against clutch collar plate 104. When pressure on the treadle is released, however, (Fig 29) the treadle will move upwardly under the back-pressure of compressed spring 105 and the clutch collar will be drawn by pin 105 acting on plate 104, into engagement with reverse gear 99. Before explaining the further operation of the machine, the various mechanisms for causing the four operations heretofore referred to, and which take place during engagement of the clutch collar 100 with gear 98, will be first described.

*The lowering of the head.*—The first operation to take place upon rotation of cam shaft 93 through gear 98, is the lowering of the head, which is carried by arms 50, the arms being pivotally mounted upon shaft 51.

Referring particularly to Figures 2, 18 and 20, the shaft 51 has centrally connected therewith, a depending arm 125, the lower end 126 of which is positioned at the rear of a pin 127 connecting the ends of two lever arms 128, which, at their lower ends, are fulcrumed on a pin 129, mounted in brackets 130 upon the rear cross brace 11. Intermediate their ends, the lever arms 128 carry between them a cam follower roller 131 which is engaged by a cam 132 upon the cam shaft 93, and as the latter is rotated to move the cam in the direction of the arrow 132', the lever arms 128 are moved rearwardly from the position illustrated in Figure 3 to the position shown in Figure 20; this movement actuates the arm 125 and rock shaft 51 to lower the head to the position illustrated in Figure 20.

It will be noted that the cam 132 has an arcuate periphery of sufficient extent to permit continued rotation of the shaft in the direction of the arrow 132' after the head is lowered, and thus the head will be maintained lowered for a considerable portion of the rotation of the cam shaft; this formation of the cam causes the latter to maintain the head lowered during the succeeding operations which are effected by other cams upon the cam shaft and until the direction of rotation of the cam shaft is reversed by engagement of the clutch collar 100 with gear 99. The lowering of the head shaft tensions a spring 135 which is secured at its upper end to an arm 136, rigid with rock shaft 51, and at its lower end, anchored to a cross rod 136' (Figure 2). When the direction of the cam shaft is reversed to release the pressure of cam 132 upon lever arms 128, this spring automatically raises the head.

*Movement of folding dies.*—Referring more particularly to Figures 2, 12, 18, and 21, the rock shaft 47, as has been explained, carries a pair of segmental gears 46 which engage the bevel gears 45 upon the two stub shafts 43 having the eccentrics 42 which actuate the folding dies. The rock shaft is provided with a handle 137 for manually operating the dies whenever this is desirable, for any reason such as to determine whether the dies are properly positioned and adjusted with reference to the slide blocks. In the operation of the machine, however, the die actuation is automatic, and follows immediately upon the lowering of the head. The rock shaft 47 is provided with a depending segmental gear 138 (Figure 12) fixed thereto, and meshing with a complemental gear 139 of segmental form having secured to one side thereof a cam follower roller 140 which is engaged by a cam 141 on shaft 93 and adapted to be moved in the direction of the arrow 142 upon rotation of the cam shaft in order to force the gears 138, 139 rearwardly, as viewed in Figure 12; this movement rocks the shaft 47. The cam is of sufficient extent so that it does not completely pass the roller 140, while moving in the direction of the arrow 142, and at the termination of the rotation of the cam shaft in the direction of the arrow, the cam is still in engagement with the roller 140 and maintains the folding dies in advanced position over the material. Upon the reversal of the direction of the cam after completion of the various operations, its engaging surface will pass roller 140, whereupon the spring 143, secured at one end to gear 139, and at its other end anchored by eye 144 to front cross brace 11, will retract the dies by moving the gears 138, 139 toward the front of the machine. As will be observed, the gear 139 is pivoted upon a bearing pin 145 mounted in bearing lugs 146 (Figure 2); the gear pivotally connected with a lug, 146'' thereon, a stop pin 147 extending through a lug 148 upon the rear brace 11, and provided with a stop nut 147' whereby to limit movement of the gear of spring 143.

*The contraction of the former dies.*—Following the folding of the edges of the material by forward movement of the folding dies, the former dies 49 are moved to withdraw the same from within the fold, which movement should precede the pressing operation.

The mechanism for actuating the former dies is shown most clearly in Figures 1, 2, 17, 18 and 19.

As has already been described, the former dies are moved from within the fold by actuation of the rack plate 65 (Figure 6) having the toothed edges 64, which engage gears 63 to rotate the shafts 62, the latter provided with the eccentric pins engaging the slide blocks 55 carrying the former dies. The rack plate 65 has a rearwardly extending lug 65', pivotally connected by means of a link 149 (Figure 2) with a lever 150 pivotally mounted for independent movement upon rock shaft 51. The lever has a central eye 150' through which the shaft 51 extends, and is provided with a second arm 152 pivotally connected with a link 153, which link is in turn connected with the end of a substantially L-shaped arm 154 (Figure 2), having a depending end portion 154', fixedly mounted upon the projecting end of a rock shaft 155, which has bearings in the adjacent end frame, and, as shown in Figure 3, extends from front to rear of the frame.

Beneath the bed 13 the rock shaft (Figure 17) has a horizontally extending arm 156, which is fixed to the shaft and is provided with an end roller 157 for engagement with an abutment cam 158, mounted on the side of a lever 159, extending downwardly from a supporting bracket 160, which has a pair of arms 161 supporting a cross pin 162 extending through the end 159' (Figure 10) of the lever 159. The lever is normally maintained in the position illustrated in Figure 1 by means of a spring 163 anchored at its upper end to an eye 159'' on the lever 159 (Figures 3 and 10), and at its lower end, to an eye 164 upon the frame.

At the rear side of the lever 169, or, in other words, on the opposite side from that viewed in Figure 17, is the cam follower roller 170, which is adapted to be engaged by a cam 171 upon the cam shaft 93 (Figure 19), and as the latter rotates from its normal position illustrated in Figure 19 in the direction of the arrow X, the roller 170 will be engaged to move the lever 159 to the right, as viewed in Figure 17, thus bringing the cam 158 into engagement with the roller 157 upon rock shaft arm 156. Continued movement of the lever 159 will depress the arm 156, and by thus moving the rock shaft 155, the arm 154 on the rear end of this rock shaft (Figure 2) will be depressed, and through the link connections 153, 149 with the rack plate, will draw the latter rearwardly, thus actuating the former-die slide blocks, and withdrawing the dies 49 from the fold of the material.

As has been explained, this movement of the rack plate 65 will move the carrier plate 69 supporting the lifter fingers, and thus carry the lifter fingers from the position shown in Figure 8, to a position in which they are, respectively, above and below the material, as illustrated in Figure 12. The former dies will be held retracted, or, in other words, withdrawn from the fold during the operation of the pressing mechanism in a manner which will be described in connection with the explanation of the mechanism for raising the bed and pressing the fold between the top surface of the bed and the folding dies.

*The pressing operation.*—The mechanism for moving the bed upwardly to press the fold of the material between its top surface and the folding dies, is shown most clearly in Figures 1, 2, 3, 10, and 17. It comprises a pair of levers 172, 173, extending beneath the bed and connected in substantially the vertical center plane of the machine by a pivot pin 174, which also has pivotally connected thereto, a substantially vertically disposed link 175 of a toggle, which is completed by a second link 176 connected to the link 175 by a pivot pin 177. The lower end of the link 176 is pivotally connected by a pin 178 to a transverse frame member 179. The lever 173 is connected at its outer end by means of a pair of links 180 (Figure 10) and stud 181, which extends through the end of the lever to the arms 182 of a bracket, the arms having a stud 183 (Figure 1) therein, which pivotally connects the links therewith. The outer end of the lever 172 is forked to provide spaced bearing eyes 184, which receive the pin 162 in bracket arms 161; it will be noted that fitted on the same pin 162, between these bearing eyes 184 is the end 159' of lever 159. The two levers 172, 173 are vertically movable by means of the links 175, 176 of the toggle, which is actuated by means of a link 185, pivotally connected at 186 to the link 175 of the toggle, and at its other end is connected by means of a pin 187 extending through a slot 188 therein, with the lower end of lever 159, so that when the latter is moved to the right (Figure 1) by the cam 171 (Figure 19) on cam shaft 93, although the initial movement of the lever will not actuate the toggle, due to the free play of the pin in slot, 188, when the pin reaches the end of the slot, continued movement of the lever under the influence of the cam will begin to straighten out the toggle 175, 176, and at the same time, move the levers 172, 173 upwardly toward horizontal position. It may be explained here, that the initial movement of the lever 159 which takes place while the pin 187 is working in the slot 188, without moving the toggle, results in bringing the cam 158 on the lever 159 into engagement with the cam roller 157 on the arm 156 on rock shaft 155, and further movement depresses arm 156 to retract the former dies on the movable head.

It will be noted that the cam 158 is pivotally mounted on lever 159, and is connected by means of a link 158' with an upstanding lug 158'' upon the rock shaft, the link having an elongated slot herein through which a pin 189 extends to permit free play of the link relative to the lug during this movement.

Movement of the toggle levers 175, 176 to lower levers 172, 173 is limited by an arm 176' (Fig. 2) connected with the toggle center pin 177 and having a slot 176'' receiving a stop pin 177' on a fixed end frame bracket 177''.

After the former dies on the movable head have been retracted from the fold, the lever arms 172, 173 are moved upwardly toward the bed 21, and for the purpose of lifting the bed evenly, the levers are provided with abutment caps 190, which are swivelled upon the ends of vertically adjustable screws 191, extending through the levers 172, 173, and locked in adjusted position by means of lock nuts 192. As the lever arms 172, 173 move upwardly, the swivel caps evenly engage the abutment plates 21 on the under surface of the bed 13, and press the bed upwardly toward the folding dies, thereby pressing the fold of the material between the bed surface and the dies.

As will be understood, the adjustable mountings of the swivel caps 190 on the lever arms, permit vertical adjustment of these caps, whereby to vary the range of lift of the bed, and the swivelling of the caps ensures even engagement of their top surfaces with the abutment plates 21 beneath the bed.

The operations thus far described, namely, (1) the lowering of the head; (2) the operative movement of the folding dies; (3) the retraction of the former dies and the simultaneous advancing of the lifting fingers 74, 75 into a position, respectively, above and below the material (Figure 20); and (4) the upward pressing movement of the bed, all take place during the rotation of the cam shaft 93 by engagement of the slidable clutch collar 100 thereon with the gear 98. Moreover, this operation takes place while the operator maintains the treadle T depressed with the actuating pin 105 and its spring 106, which actuate the clutch plate 104 moved to the left as viewed in Figs. 1–28. Upon completion of the several operations, however, and while the treadle is still depressed, mechanism is automatically operable to disengage the clutch collar from the gear 98. The clutch collar will not move into engagement with the reversing gear 99, because of the continued depression of the treadle, which maintains the yielding spring 106 on the treadle operated pin 105 in the path of the clutch collar 104, thus preventing movement of the clutch collar into engagement with the gear 99 and its clutch face.

Reference will now be had to this clutch operating mechanism, since the shifting of the clutch collar 100 out of engagement with the gear 98, is the next operation.

*The clutch shifting mechanism.*—Mechanism whereby the clutch is (a) disengaged from gear 98; (b) engaged with the reverse gear 99 upon the operator relieving the treadle of pressure; and (c) finally disengaged from reversing gear 99, is shown most clearly in Figures 1, 10 and 17. Upon the end of cam shaft 93 (Figure 2) is a cam 195, the cam having on opposite sides thereof to engage its inclined lateral faces, followers 196 which are fixedly mounted upon a lever 197 fulcrumed at its upper end to a bracket 198, and at its lower end connected by a link 199 with a plate 200, upon a rod 201, extending across the frame and slidable in openings provided in end frame braces 10′. The slide rod has mounted thereon, adjacent the opposite side of the machine, a dog 202 (Figure 9) which is pivoted to the slide rod by means of a pin 203. The dog is normally maintained in the position shown in Figure 9 by means of a spring 204, which tends to throw its free shouldered end 205 upwardly in the some horizontal plane with a sleeve 206, which encircles, and is slidable on, a rigid rod 207, extending between tubular sleeves 232 on the cross braces 10′ at opposite ends of the machine. The sleeve 206 partially encloses a coil spring 208, one end of which abuts a fixed collar 209 on the rod 207, and the other end of which abuts the closed end 210 of the sleeve. Rotation of the cam shaft 93 and the cam 195 thereon during the operations hereinbefore described, gradually swings the lower end of the lever 197 to the right, as viewed in Figures 1 and 17, and thus gradually moves the slide rod to the right, or in the direction of the arrow 211 (Figs. 27 and 9). During this movement, the shoulder 205 of the dog 202 engages the end of sleeve 206, and forces the same in the direction of movement of the slide rod, thereby compressing spring 208. The dog 202 is shaped similarly to a bell crank lever, and to the end of its depending arm 203′, is pivotally secured a pin 212, which extends through an opening in the frame brace 10′, and has adjustable stop nuts 213 thereon. When the dog 202 and slide rod have moved to the right a certain distance, the restraining nuts 213 will engage the end frame brace 10′, and upon continued movement of the slide rod, the lower end of the dog being restrained, its shoulder 205 will be moved downwardly by movement of the dog about the pivot pin 203 of an axis. The parts are adjusted so that this downward movement to disengage the dog shoulder 205 from the sleeve 206, takes place immediately upon completion of the lifting or pressing movement of the bed 13, and the spring 208 is thus free to force the sleeve or kicker 206 against the depending end of a kicker lever 214 which is fulcrumed at 215 on a rigid frame-bracket 216. The upper end 217 of the lever 214 is thus forced into engagement with a projection 218 (Figure 2) upon the clutch collar plate 104, and the force of the impact of the kicker sleeve 206 against the lower end of the lever is sufficient to throw the clutch collar out of engagement with gear 98 by engagement of the lever end 217 with projection 218 (Figure 2) upon the clutch collar plate 104.

The expansion spring 208, (Fig. 29) which actuates the kicker lever 214, has sufficient force to throw the clutch collar 100 out of engagement with gear 98 in opposition to the pressure of spring 106 on pin 105, which extends through the clutch collar plate 104; this greater strength of spring 208 as compared to spring 105 is necessary, since the depression of the treadle which is maintained by the operator after disengagement of the clutch collar with gear 98, tends through spring 105 to return the clutch collar into engagement with gear 98. When the operator removes his foot from the treadle, however, and permits the treadle to rise, the spring 106, which has been compressed by spring 208 and lever 214 assists in raising the treadle and at the same time by its back pressure, forces the pin 105 to the right, (Figs. 18 and 29) and through the engagement of the stop nut 107 on the pin with the clutch plate 104, forces the clutch collar to the right and into engagement with reverse gear 99 (Fig. 29). Consequently, so long as the operator maintains the treadle depressed, the clutch will remain in neutral position under the influence of kicker lever 214 (Fig. 28), notwithstanding the tendency of spring 105 to force the clutch collar into engagement with gear 98, since the spring 208 actuating the kicker lever is stronger than spring 105. Thus the operator may continue the upward pressing operation of the bed 13 on the material fold as long as he desires, and under ordinary circumstances, he will do so until prepared to lay another blank on the bed. Upon removal of his foot from the treadle, however, the back-pressure of spring 105 will throw the clutch collar immediately into engagement with reverse gear 99, whereupon the cam shaft will be rotated in the reverse direction with its cams, and the following operations will occur in succession.

1. The cam 171 (Figure 1) will permit lever 159 to move to the left under influence of spring 163 (Figure 3) and through the link connection 185, the bed lifting levers 172, 173 will be lowered to permit the bed to drop upon its supporting cradle.

2. The folding die actuating cam 141 (Figure 12) will pass the follower roller 140 on the actuating segment gear 139, thus permitting spring 143 to rock shaft 47 in the opposite direction and retract the folding dies.

3. The head actuating cam 132 (Figure 20) will rotate in a direction opposite that indicated by arrow 132′, and thus permit spring 135 to raise the head. As the head rises, the lift fingers will grip the material blank, since they have been previously moved into position above and below the material as the former dies were retracted. As the head rises, the finger 75 will be free to move upwardly toward finger 74', since the abutment screw 80, which maintains finger 75 spaced from finger 74 while the head is in operative position, is raised from the top 12 surrounding the bed.

When the head reaches its raised position shown in Figure 3, the former dies will be again expanded, which is accomplished by means of an upstanding stud 219 (Figure 2) on the lug 148 of the frame engaging the arm 154 (Figs. 2 and 12).

As will be understood, engagement of the stud 219 with the under surface of the arm 154 as the latter is bent forces arm 154 upwardly, thus rocking lever arms 150, 152 on the rock shaft 51, which supports the head 50, and thereby forcing forwardly the rack plate 65 on the head.

This forward movement of the rack plate moves the former dies to operative position on the head, and also moves the lift fingers forwardly so that they will be again in operative position upon descent of the head. The only operation that remains to be performed, is disengagement of the clutch collar 100 from the reverse gear 99 which will now be described.

Referring again to Figures 9 and 27, it will be noted that the rod 207 has positioned thereon, a second sleeve 220, which partially surrounds a spring 221 abutting the closed end 220', of the sleeve, and a collar 222 upon the rod. The closed end 220' of the sleeve is adapted to strike the end of a link 240 connected through its slot 241 with a collar 223 fixed on rod 207.

The upwardly extending arm 223' of a bracket 224, having a body fastened to the slide-rod 201, engages the end of the sleeve 220 as the slide 201 moves to the right (Fig. 9).

The bracket 224 has a depending lug 225, which is connected by means of a rod 226, with a bell crank lever 227, the latter being pivoted at 228 to a detent 229 which is pivotally mounted at 230 upon a depending lug 231, fixedly secured to the sleeve 232 secured to the frame piece 10', and receiving the end of the rod 207.

The detent 229 has a shoulder 233 which is normally urged toward the sleeve 220 by means of a spring 234 fastened to the opposite end 229' of the detent, and anchored to an eye 235 on the frame piece 10'. As the slide rod moves toward the right in the direction of the arrow 211, as described in connection with the operation which compresses the spring 208 operating sleeve 206, the pressure of the bracket arm 223' upon the end 220' of sleeve 220 forces the sleeve to the right, compressing spring 221 (Fig. 27). As the end 220' of the sleeve moves past the shoulder 233, of the detent 229, the shoulder is forced upwardly in the path of the sleeve 220 by spring 234, and thus restrains the sleeve from moving toward the left when the slide bar 201 with the bracket arm 223' is moved in the opposite direction by reverse movement of the cam shaft 93 and the slide actuating cam 195 (Fig. 1).

As the movement of the slide bar 201 toward the left continues, however, the detent shoulder 233 is drawn downwardly through the connection of the bracket 224 with bell crank lever 227, pivoted at 228 upon the detent. The depending arm 227' of the bell lever has a pin 227'' disposed beneath the slide bar, and as the slide bar moves to the left, the lever 227 tends to rock about its pivot 228, for the reason that the latter is on the detent which, in turn, is fixedly held against movement with the slide by the fixed bracket 231 on which it is pivotally mounted.

This rocking movement of the lever 227, by pressing the pin 227'' against the under surface of the rod, pulls the detent 229 downwardly, thus releasing the plunger sleeve 220, and permitting the spring 221, which has been compressed during the movement of the slide to the right, to move the sleeve to the left (Figure 9) and disengages the clutch collar 101 from reverse gear 99.

The disengagement of the clutch and reverse gear 99 is effected through a link 240 (Figure 9) having a pin and slot connection 241 with the collar 223, which is fixed on rod 207. The link 240 is pivotally connected at 242 with the lower end of a lever 243, pivoted at its upper end 244 (Figure 17) upon an arm 245 extending over the clutch collar plate 104. The lever 243 has a nose portion 246 adapted to engage the face of clutch collar plate 104, under the influence of spring 221, which is imparted thereto through the sleeve 220 and collar 223. The loose pin and slot connection between collar 223 and lever link 240, permits the spring to develop considerable impact force when taking up this play and the link is thus struck a substantial blow, and under the impact, throws nose 246 of the lever 243 against the clutch collar 101 from gear 99, and moving the clutch collar to neutral position.

Referring to Figures 9 and 10, it will be noted that the bracket 224 has connected therewith a horizontally and rearwardly extending arm 249 which has a pin and slot connection 250 with a link 251, the end of which is connected at 252 with a detent lever 253 pivoted at 254 upon a frame lug 255, the latter having a detent stop 256 adapted to engage the lever. The purpose of this connection is to provide a means for slightly forcing the sleeve 206 away from the lower end of lever 214 as the clutch is finally moved to neutral position, thus permitting the upper end of lever 214 to move to the left as viewed in Figures 1 and 17, so as not to interfere with the treadle actuation of the clutch collar into engagement with gear 98 when the series of operations is to be repeated.

As will be understood, the upper end 217 of lever 214 is moved to the right (Figure 1) under the influence of spring 208, and the pressure of the spring will maintain the upper end of the kicker lever in its advanced position to the right until some means slightly compresses spring 208 so that the kicker lever may move to a position back of the plane of the gear 98. This cannot be accomplished by the pressure upon the treadle, for the reason that the connection between the treadle and clutch collar plate 104 is an impositive or yielding one, being through the spring 106 and pin 105, slidable through the plate; and the spring 106 has less force than spring 208, which maintains the kicker lever 214 in its position preventing engagement of the clutch collar and gear 98. Hence the treadle will not engage the clutch collar with gear 98 unless the upper end of lever 214 is free to move back of the plane of the gear under the pressure of the clutch collar.

In the construction described, however, the spring 208 is slightly compressed by the spring 221 when the latter actuates the detent lever 253 through the link connection 251, and thus the upper end 217 on the lever 214 will be free to move to the left when engaged by the clutch collar plate 104, as the latter is moved by the treadle to engage the clutch collar with the gear 98.

The yielding impositive connection between the treadle and clutch collar through the slidable pin 105 and spring 106, permits the operator, by maintaining the treadle depressed during the fold pressing operation, to prevent the clutch collar from engaging reverse gear 99, and when it is desirable to conclude the pressing operation by simply permitting the treadle to rise the clutch collar will be moved into engagement with the reverse gear through the engagement of stop nut 107 on pin 105 with the clutch collar plate 104.

Since the operation of the device has been described in connection with the description of the construction of the various parts, further explanation of the operation is unnecessary.

By "manually" as used in the specification and claims when referring to the operability of parts of the machine, is meant a part which is to be actuated by the operator of the machine whether by his hands or feet; in other words, the term "manually" is used in a generic sense to define a part controlled by the operator of the machine.

Obviously, the details of the preferred embodiment described may be modified materially without departing from the invention.

I claim:

1. In a machine of the class described, a material bed, former dies movable toward and from the bed, folding dies for material on said bed, means for actuating said folding dies and for subsequently and automatically in succession contracting said former dies and thereafter pressing the folded material, means for discontinuing said pressing operation and means for varying at will the duration of the pressing operation.

2. In a machine of the class described, a material bed, means for folding material thereon, a head movable toward and from the bed, material gripping members on said head for lifting folded material from the bed, and means for moving said gripping members in a substantially horizontal plane toward the material on the bed to receive the material between said members.

3. In a machine of the class described, a material bed, means for folding material thereon, a head movable toward and from the bed, former dies on said head and means on said head for removing folded material from the bed, and means for moving said last mentioned means in a substantially horizontal plane toward said dies and the material on the bed.

4. In a machine of the class described, a material bed, means for folding material thereon, a head movable toward and from the bed, and means on said head for removing folded material from the bed, said last mentioned means being movable on the head in a substantially horizontal plane toward the material on the bed, dies on said head, and means for relatively moving said dies and for imparting said horizontal movement to the lifting means.

5. In a folding machine of the class described, a material bed, a head movable toward and from the bed, dies on said head relatively movable thereon, material gripping members on the head for engaging folded material and lifting it from the bed, and means for actuating said head and dies and for substantially horizontally moving said gripping members toward the material on the bed, whereby to receive the latter between said members.

6. In a machine of the class described, a vertically movable bed, folding dies over said bed, means for operating said dies, means for moving the bed upwardly to press a fold between said dies and bed, automatic clutch shifting mechanism operable during said pressing operation, reversing mechanism for actuating the dies and permitting lowering of the bed, and means operable at will for controlling the initiation of said reversing mechanism.

7. In a machine of the class described, a vertically movable bed, folding dies over said bed, means for operating said dies, means for moving the bed upwardly to press a fold between said dies and bed, automatic clutch shifting mechanism operable during said pressing operation, reversing mechanism for actuating the dies and lowering the bed, means operable at will for controlling the initiation of said reversing mechanism, said reversing mechanism including a reverse gear and a clutch, and means for automatically shifting the clutch into engagement with said reverse gear.

8. In a machine of the class described, a vertically movable bed, folding dies over said bed, means for operating said dies, means for moving the bed upwardly to press a fold between said dies and bed, automatic clutch shifting mechanism operable during said pressing operation, reversing mechanism for actuating the dies and permitting lowering of the bed, means operable at will for controlling the initiation of said reversing mechanism, said reversing mechanism including a reverse gear and a clutch, means for automatically shifting the clutch into engagement with said reverse gear, and means for automatically disconnecting said clutch from said reverse gear.

9. A machine of the class described comprising former dies, folding dies and fold pressing means, a cam shaft, means for rotating said cam shaft in opposite directions, manually operable means for causing rotation of the cam shaft in one direction, means for automatically interrupting rotation of the cam shaft, means operable at will to initiate rotation of the cam shaft in a reverse direction, and automatic means for discontinuing reverse rotation of said cam shaft.

10. In a machine of the class described, a vertically movable material bed, folding dies over said bed, a head movable toward and from the bed and carrying former dies, means for advancing the folding dies, means for withdrawing the former dies from the fold, means for moving the bed upwardly to press a fold between the same and the folding dies after the former dies have been withdrawn, all of said means being operable automatically in succession, means for retracting the folding dies and for raising said head, said last mentioned means following the pressing operation, means for preventing at will the discontinuance of said pressing operation, and automatic clutch shifting mechanism controlled by said last mentioned means.

11. In a machine of the class described, a material bed, means for folding material thereon, a head movable toward and from the bed, dies on said head, means carried by said head for lifting folded material from the bed independently of said dies, and a common means for contracting said dies and for moving said last mentioned means in a substantially horizontal plane toward the material on the bed.

12. In a machine of the class described, a material bed, means for folding material thereon, a head movable toward and from the bed, dies on said head, a pair of complemental material gripping members carried by said head for lifting the folded material from the bed as the head rises, and means for bodily moving said gripping members in a substantially horizontal plane toward the material on the bed, whereby to receive the latter between the said members.

13. In a machine of the class described, a material bed, means for folding material thereon, a head movable toward and from the bed, dies on said head, a pair of complemental material gripping members carried by said head for lifting the folded material from the bed as the head rises, means for bodily moving said gripping members in a substantially horizontal plane toward the material on the bed, whereby to receive the latter between the said members, said last means serving also to simultaneously contract said dies whereby to withdraw the same from the fold of the material.

14. In a machine of the class described, a material bed, means for folding material thereon, a head movable toward and from the bed, dies on said head, a pair of complemental material gripping members carried by said head for lifting the folded material from the bed as the head rises, and means for bodily moving said gripping members in a substantially horizontal plane toward the material on the bed, whereby to receive the latter between the said members, one of said gripping members being movable toward the other member to grip the material, and the other member being fixed relative to the movable member.

15. In a machine of the class described, a material bed, means for folding material thereon, a head movable toward and from the bed, dies on said head, a pair of complemental material gripping members carried by said head for lifting the folded material from the bed as the head rises, and means for bodily moving said gripping members in a substantially horizontal plane toward the material on the bed, whereby to receive the latter between the said members, one of said gripping members being movable relative to the other member to grip the material, and the other member being fixed relative to the movable member, said bed having depressed portions to permit one of said gripping members to be moved beneath the material below the supporting plane of the bed.

16. In a machine of the class described, a material bed and a head movable toward and from said bed, contractible former dies carried by said head, and a pair of complemental fingers adapted to grip material therebetween carried by said head and bodily movable toward and from the dies to receive material therebetween.

17. In a machine of the class described, a material bed and a head movable toward and from said bed, contractible former dies carried by said head, and a pair of material gripping fingers carried by said head and bodily movable toward and from the dies and adapted to grip folded material therebetween, and means for moving said fingers to receive material therebetween as the dies are contracted.

18. In a blank folding machine and in combination a bed upon which the blank to be folded is placed, a die carrying head above the bed and movable toward and from the bed, means for folding an edge of a blank, means carried by the head adapted to be positioned over the blank-edge, and a clamping member adapted to press the material against said last mentioned means, and means for moving said clamping member to an operative position beneath the blank after it has been folded.

19. In a machine of the class described, a material bed, a head carrying former dies movable toward and from the bed, folding dies for material on said bed, and means for automatically in sequence: (1) actuating said folding dies, (2) contracting said former dies to withdraw the same from a fold, and thereafter (3) pressing the folded material, means for releasing said folded material and means for controlling selectively the initiation of operation of said releasing means whereby to vary at will the duration of said pressing operation.

20. In a machine of the class described, a material bed, a head carrying former dies movable toward and from the bed, folding dies for material on said bed, and means for automatically: (1) actuating said folding dies, (2) contracting said former dies to withdraw the same from a fold and thereafter (3) pressing the folded material, means for releasing said folded material and for automatically raising said former dies, and means for controlling selectively the initiation of operation of said releasing means whereby to vary at will the duration of said pressing operation.

21. In a machine of the class described, a material bed, a head carrying former dies movable toward and from the bed, folding dies for material on said bed, and means for automatically: (1) actuating said folding dies, (2) contracting said former dies to withdraw the same from a fold, and thereafter (3) pressing the folded material, means for releasing said folded material and for automatically raising said head and former dies, means for controlling selectively the initiation of operation of said releasing means whereby to vary at will the duration of said pressing operation, and means carried by said head adapted to grip the material independently of said former dies and to lift the material from the bed as the head rises.

22. In a machine of the class described, a material bed for receiving a blank, an edge of which is to be folded, folding dies for folding over an edge of a blank on said bed, means for automatically: (1) operating said folding dies and (2) pressing the folded material, said means comprising a driven shaft, clutch mechanism associated with said shaft and means for automatically operating said clutch mechanism without discontinuing the pressing operation, means operable to discontinue the pressing operation and withdraw said folding dies, and means under the control of the operator for selectively controlling the initiation of said last mentioned means whereby to vary at will the duration of the pressing operation.

23. In a machine of the class described, a material bed for receiving a blank an edge of which is to be folded, folding dies for folding over an edge of a blank on said bed, former dies, a head movable toward and from said bed carrying said former dies, means for automatically: (1) lowering said head, (2) operating said folding dies, (3) contracting said former dies and (4) pressing the folded material, said means comprising a driven shaft, clutch mechanism associated with said shaft and means for automatically operating said clutch mechanism without discontinuing the pressing operation, means operable to discontinue the pressing operation, and means under the control of the operator for selectively controlling the initiation of said last mentioned means whereby to vary at will the duration of the pressing operation.

24. In a machine of the class described, a material bed for receiving a blank an edge of which is to be folded, folding dies for folding over an edge of a blank on said bed, former dies, a head movable toward and from said bed carrying said former dies, means for automatically: (1) lowering said head, (2) operating said folding dies, (3) contracting said former dies, and (4) pressing the folded material, said means comprising a driven shaft, clutch mechanism associated with said shaft and means for automatically operating said clutch mechanism without discontinuing the pressing operation, means operable to shift said clutch mechanism to discontinue the pressing operation and automatically to raise said head, and means under the control of the operator for selectively controlling the initiation of said last mentioned means whereby to vary at will the duration of the pressing operation.

25. In a machine of the class described, a material bed for receiving a blank an edge of which is to be folded, folding dies movable toward and from the blank on the bed, a head movable toward and from the bed, former dies on said head, and means (1) to operate said folding dies to fold the material, (2) to press the folded material, and (3) to release the folded material, said means comprising a driven shaft, clutch mechanism associated with said shaft, means for automatically shifting said clutch mechanism to a neutral position upon initiation of said pressing operation without interrupting said operation, means for automatically again shifting said clutch mechanism to release the folded material, and means under the control of the operator for selectively controlling the initiation of said last mentioned means whereby to vary at will the duration of said pressing operation.

26. In a machine of the class described, a bed to receive a blank to be folded, folding dies over said bed, means for operating said dies, means for pressing the folded material between said dies and bed, automatic clutch shifting mechanism operable upon initiation of said pressing operation without discontinuing the latter, reverse mechanism for actuating said dies and releasing the material, and means operable at will for controlling the initiation of said reversing mechanism.

27. In a machine of the class described, a bed to receive a blank, an edge of which is to be folded, folding dies, means for operating said dies, means for pressing a folded blank between said dies and bed, automatic clutch shifting mechanism operable during said pressing operation, automatic reversing mechanism for withdrawing the dies and discontinuing the pressing operation, and means operable at will for controlling the initiation of said reversing mechanism, said reversing mechanism including a reverse gear and a clutch, and means for automatically shifting the clutch into engagement with said gear.

28. A machine of the class described comprising former dies, folding dies and fold pressing means, a cam shaft, means for rotating said shaft in opposite directions whereby to actuate said dies and pressing means, means under the control of an operator for initiating movement of the shaft in one direction whereby to fold the material and press the folded material, means for automatically interrupting rotation of the cam shaft in said direction without interrupting said pressing operation, means for automatically in succession discontinuing said pressing operation and operating said dies by rotation of the cam shaft in a reverse direction, means operable at will to initiate rotation of the cam shaft in a reverse direction, and automatic means for discontinuing reverse rotation of said shaft.

29. In a folding machine and in combination, a material bed, folding dies, means for pressing material on said bed, power means for actuating said dies and pressing means, a clutch mechanism, means manually operable to actuate said clutch mechanism whereby to connect said folding means and pressing means with said power means, and means for automatically shifting said clutch mechanism to cause withdrawal of said dies and discontinuance of the operation of said pressing means.

30. In a folding machine and in combination a material bed, folding dies, means for pressing material on said bed, power means for actuating said dies and pressing means, a clutch mechanism, means manually operable to actuate said clutch mechanism whereby to connect said folding means and pressing means with said power means, means for automatically shifting said clutch mechanism to cause withdrawal of said dies and discontinuance of the operation of said pressing means, and manually operable means arranged to control initiation of said last mentioned automatic shifting means whereby to vary at will the duration of said pressing means.

31. In a folding machine and in combination, a material bed, folding dies, means for pressing material on said bed, power means for actuating said dies and pressing means, a clutch mechanism, means manually operable to actuate said clutch mechanism whereby to connect said folding means and pressing means with said power means, means for automatically shifting said clutch mechanism to cause withdrawal of said dies and discontinuance of the operation of said pressing means, and means for automatically shifting said clutch mechanism to a neutral position upon withdrawal of said dies and discontinuance of the pressing operation.

32. In a machine of the class described, a material bed, folding dies movable over the bed, means for pressing the folded material, power means, gearing for connecting up said power means to move said dies and to press material on said bed, gearing for connecting up said power means to withdraw said dies and to release said material, and means for automatically disconnecting said first mentioned gearing from said power means when the material is pressed and for automatically connecting said second gearing with said power means.

33. In a machine of the class described, a material bed, folding dies movable over the bed, means for pressing the folded material, a head movable toward and from said bed, former dies on said head, power means, gearing for connecting said power means to lower said head and move said dies and to press material on said bed, gearing for connecting up said power means to withdraw said dies, release said material and to raise said head, and means for automatically disconnecting said first mentioned gearing from said power means when the material is pressed, and for automatically connecting said second gearing with said power means.

34. In a machine of the class described, a material bed, folding dies movable over the bed, means for pressing the folded material, power means, gearing for connecting up said power means to move said dies and press material on said bed, gearing for connecting up said power means to withdraw said dies and to release said material, and means for automatically disconnecting said first mentioned means when the material is pressed and for automatically connecting said second gearing with said power means, and means for automatically disconnecting said second gearing from said power means upon completion of the operations performed thereby.

35. In a machine of the class described, a material bed, folding dies movable over the bed, means for pressing the folded material, power means, gearing for connecting up said power means to move said dies and press material on said bed, gearing for connecting up said power means to withdraw said dies and to release said material, and means for automatically disconnecting said first mentioned gearing from said power means when the material is pressed and for automatically connecting said second gearing with said power means, and means optionally operable to vary at will the duration of the period between the disconnection of said first gearing with said power means and the connection of the second gearing therewith.

36. In a machine of the class described, a material bed, folding dies movable over the bed, means for pressing the folded material, a head movable toward and from said bed, former dies on said head, power means, gearing for connecting said power means to lower said head, move said dies and to press material on said bed, gearing for connecting up said power means to withdraw said dies, release said material and to raise said head, means for automatically disconnecting said first mentioned gearing from said power means when the material is pressed and for automatically connecting said second gearing with said power means, and means optionally operable to vary at will the duration of the period between the disconnection of said first gearing with said power means and the connection of the second gearing therewith.

37. In a machine of the class described, a material bed, a head movable toward and from said bed, former dies carried by said head, a picker finger carried by said head and movable thereon toward and from said dies and beneath the dies when the latter are arranged on the bed, and means for moving said finger beneath said dies and between the bed and a blank disposed thereon.

38. In a machine of the class described, a material bed adapted to support a blank, an edge of which is to be folded, a head movable toward and from said bed, former dies carried by said head, folding dies adapted to fold an edge of a blank over said former dies, a picker finger carried by said head and adapted to be moved thereon between the bed and a blank arranged on the said bed beneath the former dies, said finger being adapted to lift the folded blank from the bed as the head rises.

39. In a machine of the class described, a material bed adapted to support a blank an edge of which is to be folded, a head movable toward and from said bed, former dies carried by said head, folding dies adapted to fold an edge of a blank over said former dies, a picker finger carried by said head and adapted to be moved between the bed and a blank arranged on the said bed beneath the former dies, said finger being adapted to lift the folded blank from the bed as the head rises, said bed being formed with a recess adapted to receive said finger below the blank supporting plane of the bed.

40. In a machine of the class described, a material bed vertically movable for pressing operations, a support for said bed in its lowered position comprising independently adjustable screw elements adapted to angularly adjust the bed, and means carrying said screw elements having associated therewith wedge devices for bodily adjusting said means vertically, and thereby moving the bed vertically.

41. In a machine of the class described, a material bed vertically movable for pressing operations, a support for said bed in its lowered position comprising independently adjustable screws adapted to angularly adjust the bed, and means carrying said screws, said means being movable for bodily adjusting the bed vertically, said means comprising a fixed supporting element and an element horizontally movable relative to said fixed element and the bed, one of said elements having a wedge surface, whereby relative horizontal movement therebetween will result in vertical movement of one of the elements.

42. In a machine of the class described, a material bed vertically movable for pressing operations, a support for said bed in its lowered position comprising independently adjustable screws adapted to adjust the bed angularly, horizontally movable strips supporting said screws, rigid bracket strips providing rests for said screw carrying strips, means for producing relative movement between said screw carrying strips and said rigid bracket strips, and wedge means adapted to impart vertical movement to said screw carrying strips upon such relative movement, whereby to adjust all of said screws simultaneously and vary the lowermost position of the bed.

In testimony whereof I have hereunto set my hand.

WALTER J. BEATTIE.